United States Patent [19]

Usui et al.

[11] Patent Number: 4,549,399
[45] Date of Patent: Oct. 29, 1985

[54] EXHAUST EMISSION CONTROL SYSTEM FOR DIESEL ENGINE

[75] Inventors: Toshifumi Usui, Katsuta; Syozo Yanagisawa, Ibaraki, both of Japan

[73] Assignee: Hitachi, Ltd., Tokyo, Japan

[21] Appl. No.: 573,138

[22] Filed: Jan. 23, 1984

[30] Foreign Application Priority Data

Jan. 24, 1983 [JP] Japan ............................ 58-8654
Mar. 7, 1983 [JP] Japan ............................ 58-36020

[51] Int. Cl.⁴ ............................................. F01N 3/02
[52] U.S. Cl. .................................. 60/286; 55/283; 55/466; 55/525; 55/DIG. 10; 55/DIG. 30; 60/303; 60/311
[58] Field of Search ............... 60/286, 303, 311; 55/283, 466, 525, DIG. 10, DIG. 30

[56] References Cited

U.S. PATENT DOCUMENTS 4,211,075 7/1980 Ludecke .............................. 60/285
4,335,574 6/1982 Sato ..................................... 60/303
4,450,682 5/1984 Sato ..................................... 60/303

*Primary Examiner*—Douglas Hart
*Attorney, Agent, or Firm*—Antonelli, Terry & Wands

[57] ABSTRACT

An exhaust emission control system for a diesel engine including a trap in the form of a filter formed of heat-resistant material for trapping carbon particulates. The trap has no directionality with respect to air permeability, and combustion gas, for heating the trap or a fuel for activating a catalyst provided to the trap, is supplied to the trap from a direction substantially perpendicular to a direction in which an exhaust gas flows from the engine to the trap. Upon a blocking of the trap as a result of an accumulation of the trapped carbon particulates, the trapped carbon particulates can be removed by oxidation treatment, to thereby enable regeneration of the trap to be effected with a high degree of efficiency.

5 Claims, 7 Drawing Figures

EXHAUST EMISSION CONTROL SYSTEM FOR DIESEL ENGINE

BACKGROUND OF THE INVENTION

This invention relates to exhaust emission control systems employing a trap for catching carbon particulates in exhaust emissions of diesel engines, and, more particularly, to an exhaust emission control system capable of effectively regenerating the trap by subjecting the carbon particulates caught by the trap to oxidation treatment.

Depending upon load conditions, exhaust gases of diesel engines are generally exhausted in black fumes due largely to the presence of carbon particulates therein. An increase in motor vehicles has given rise to the problem of air pollution by the flue gases of combustion engines, and the black fumes exhausted by diesel engines are no exception. To avoid this problem, an exhaust emission control system using a trap for catching carbon particulates has been in wide use.

In this type of exhaust emission control system, the carbon particulates caught by the trap increases in amount during use, causing a blockage of the trap. Thus, it is necessary to regenerate the trap to catch carbon particulates by removing the particulate material adhering to the trap by subjecting the carbon particulates to oxidation treatment.

Several proposals have been made to solve the problem of blockage of the trap of an exhaust emission control system for a diesel engine.

More particularly, in for example, Japanese Patent Laid-Open No. 18016/81, an exhaust emission control system is proposed wherein a burner is located upstream of a trap formed as a ceramic filter of a honeycomb shape for catching carbon particulates. The back pressure of the engine is sensed when a predetermined amount of carbon particulates are trapped by the ceramic filter, to actuate the burner to burn the carbon particulates thereby removing the same from the ceramic filter.

In, for example, Japanese Patent Laid-Open No. 904112/81, another exhaust emission control system is proposed wherein a honey-comb shaped ceramic filter is provided with a coat of platinum serving as a catalyst. When a predetermined amount of carbon particulates are trapped by the ceramic filter, the back pressure of the engine is sensed and a fuel, such as propane, is fed through a fuel nozzle to the ceramic filter to activate the platinum catalyst. In all systems of the aforementioned type, the combustion gas from the burner or the fuel from the nozzle is directly introduced into the exhaust pipe. Thus, difficulties are experienced in creating the necessary conditions for oxidation treatment to enable a removing of the carbon particulates from the trap because such condition would be greatly influenced by changes in the physical and chemical properties of the exhaust emissions, thereby making it impossible to regenerate the trap effectively and efficiently.

In the exhaust emission control system proposed in aforementioned Japanese Patent Laid Open No. 18016/81, the trap is held at a high temperature of about 700° C. to burn the carbon particulates. In this system, when the engine operation conditions vary and the pressure, flow rate, temperature and composition of the exhaust emission undergo changes, the temperature of the trap would also show a change, thereby making it impossible to continuously maintain the trap at a temperature at which the trap regeneration efficiency can be maximized.

In the exhaust emission control system proposed in aforementioned Japanese Patent Laid Open No. 904112/81, it is necessary to provide an atmosphere which is maintained substantially constant to ensure the existence of the conditions necessary for performing oxidation of the carbon particulates at a desired level. However, as with the system of Japanese Laid-Open No. 18016/81, this system also suffers the disadvantage that the atmosphere created can not be maintained substantially constant due to the changes occurring in the exhaust emissions, resulting in a reduction in regeneration efficiency.

This invention has been developed for the puspose of avoiding the disadvantages of the prior art. Accordingly, an aim of the present invention essentially resides in the provision of an exhaust emission control system for a diesel engine capable of creating a substantially constant condition for performing oxidation of the carbon particulates caught by the trap irrespective of changes occurring in exhaust emissions, thereby enabling regeneration of the trap to be performed with a high degree of efficiency at all times.

In accordance with advantageous features of the invention, an exhaust emission control system for a diesel engine is provided which comprises a trap in the form of a filter formed of heat-resisting material for trapping carbon particulates, with the trap being regenerated by subjecting the trapped carbon particulates to an oxidation treatment when the trap is blocked. The trap used is of a type which has no directionality with respect to air permeability, and a gas for heating the trap or a fuel for reactivating a catalyst is fed to the trap in a direction which is substantially perpendicular to a direction in which exhaust emissions flow from the diesel engine through the trap.

DETAILED DESCRIPTION

Figure 1:
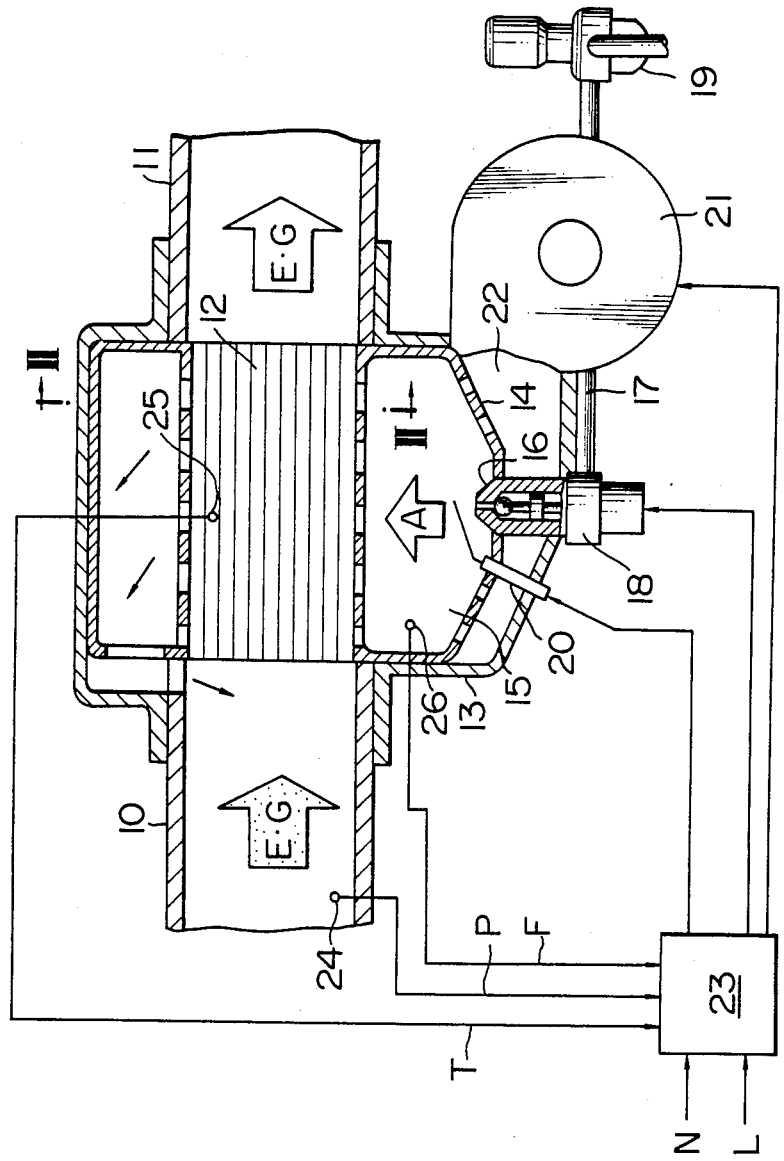
FIG. 1 is a cross sectional partially schematic view of the exhaust emission control device for a diesel engine comprising one embodiment of the invention.
Figure 2:
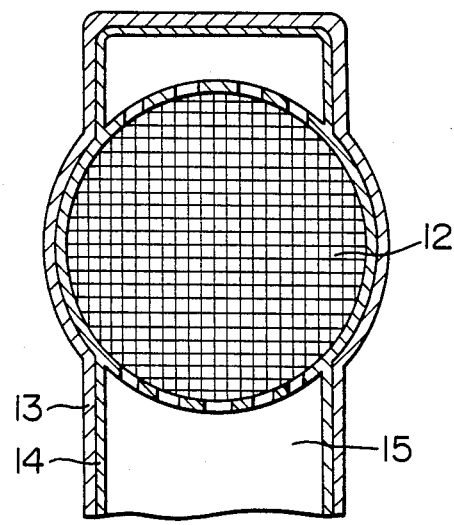
FIG. 2 is a cross sectional view taken along the line II—II in FIG. 1.

Referring now to the drawings wherein like reference numerals are used throughout the various views to designate like parts and, more particularly, to FIGS. 1 and 2, according to these figures, an exhaust pipe 10 is connected at one end to an exhaust manifold of the engine, with an exhaust pipe 11 communicating at one end with the atmosphere. The exhaust emission control system comprises a trap 12 in the form of a ceramic filter provided with a coat of platinum serving as a catalyst and having no directionality with respect to air permeability, a casing 13, a partition member 14, an injection chamber 15, a nozzle 16, a fuel pipe 17, a fuel injection valve 18 for performing duty operation actuated by a control circuit subsequently to be described for feeding a fuel to the nozzle 16, a fuel pump 19, an ignition electrode 20, a fan 21 and an air chamber 22.

The trap 12 which is interposed between the two exhaust pipes 10, 11 is what is generally referred to as a ceramic foam filter having a three-dimensional net-like structure. The trap 12 has a coat of platinum applied thereto to serve as a catalyst, and performs the function of filtering the exhaust emissions of the engine to catch carbon particulates incorporated in the exhaust emissions.

The casing 13 defines the air chamber 22, with the partition member 14 formed with a plurality of apertures and serving to bring separate the injection chamber 15 from the air chamber 22. The nozzle 16 injects a fuel into the injection chamber 15, with a supply of fuel to the nozzle being delivered from the fuel pump 19 through the fuel pipe 17, and with the amount of fuel supplied to the nozzle 16 being controlled by the fuel injection valve 18.

The ignition electrode 20 is operative, when a high voltage is impressed thereon, to produce a spark between it and the nozzle 16 to ignite the fuel injected through the nozzle 16 into the injection chamber 15. The fan 21 feeds air into the air chamber 22.

The exhaust emission control system of the above-described construction operates as follows:

Exhaust gas EG from the diesel engine flows through the exhaust pipe 10 and the trap 12 into the exhaust pipe 11 and is released into the atmosphere. While the exhaust gas EG is flowing through the trap 12, it is filtered and cleared of carbon particulates which are trapped by the trap 12.

After a prolonged operation of the diesel engine and the amount of carbon particulates trapped in the trap 12 exceeds a predetermined level, the trap 12 becomes blocked and the back pressure of the engine rises. When this condition is reached, the fan 21 is actuated to feed air into the air chamber 22 and, at the same time, the fuel injection valve 18 is controlled to allow a predetermined amount of fuel to be injected through the nozzle 16 into the injection chamber 15.

In the injection chamber 15, air introduced thereinto through the apertures formed at the partition member 14 and fuel injected through the nozzle 16 are mixed with each other to produce a fuel-air mixture favorable for reactivating the platinum coat serving as a catalyst which is directed against the trap 12 in a direction indicated by an arrow A in FIG. 1.

As described above, the trap 12 has a three-dimensional, net-like structure which has no directionality with respect to air permeability, so that the fuel-air mixture of the catalyst reactivating atmosphere is readily allowed to flow through the trap 12 and the coat of platinum is fully exposed to the reactivating atmosphere.

As a result, the platinum coat of the trap 12 is fully reactivated and the carbon particulates caught by the trap 12 are readily oxidized at a low temperature of about 250° C. and the oxidized carbon particulates undergo decomposition and disappear, to thereby regenerate the trap 12.

To effect activation of the catalyst satisfactorily to carry out oxidation and decomposition of the carbon particulates successfully, it is necessary that the fuel-air mixture of the catalyst reactivating atmosphere contain predetermined ranges of hydrocarbons and carbon dioxide, in addition to the need to maintain its temperature at a desired level.

In the exhaust emission control system proposed in aforementioned Japanese Laid Open No. 904112/81, a fuel is directly fed into the exhaust pipe to mix with the exhaust gas flowing therein from the engine to provide a mixture of a catalyst reactivating atmosphere. Thus, the mixture of the catalyst reactivating atmosphere would be influenced by physical and chemical changes undergone by the exhaust gas and difficulties would be experienced in producing a catalyst reactivating condition, thereby making it impossible to obtain necessary trap regeneration efficiency.

However, in the embodiment of the invention shown in FIGS. 1 and 2, a fuel-air mixture of a catalyst reactivating atmosphere is produced in the injection chamber 15 which is not appreciably influenced by the physical and chemical changes which the exhaust gas undergoes because it is not in direct communication with the passage of the exhaust gas. This enables control of the fuel-air mixture of the catalyst reactivating atmosphere to be satisfactorily effected merely by controlling the amount of the fuel supplied through the fuel control valve 18. As a result, activation of the catalyst provided to the trap 12 can be readily effected, to thereby enable regeneration of the trap 12 to be effected with a high degree of efficiency.

In the embodiment of FIGS. 1 and 2, air is supplied by the fan 21 to the injection chamber 15, as is clearly shown in FIG. 1. The ignition electrode 20 is located in a vicinity of the nozzle 16, so that the nozzle 16 can function as a burner when necessary, to produce a combustion gas of high temperature by a complete combustion in the injection chamber 15 of a mixture of air supplied through the apertures formed in the partition member 14 and fuel supplied through the nozzle 16, to heat the trap 12.

Thus, in the embodiment of FIGS. 1 and 2, the nozzle 16 can be made to function as a burner to control a rise in the temperature of the trap 12, when the exhaust gas from the engine is not high enough to maintain the temperature of the trap 12 at about 250° C. which is necessary to effect activation of the platinum catalyst.

Thus, in the embodiment of FIGS. 1 and 2 a filter provided with no coat of platinum serving as a catalyst may be used and such filter may be heated to temperature of about 700° C., so as to effect removal of the trapped carbon particlulates by oxidation treatment performed by combustion, in the same manner as described in the exhaust emission control system proposed in Japanese Laid Open No. 18016/81. In this case, since the combustion gas used for heating the trap 12 is produced in the injection chamber 15, as described hereinabove, which is substantially free from the influence exerted by the physical and chemical changes which the exhaust gas undergoes, it is possible to stably effect control of the temperature of the trap 12, thereby enabling regeneration of the trap 12 to be effected with a high degree of efficiency.

Figure 4:
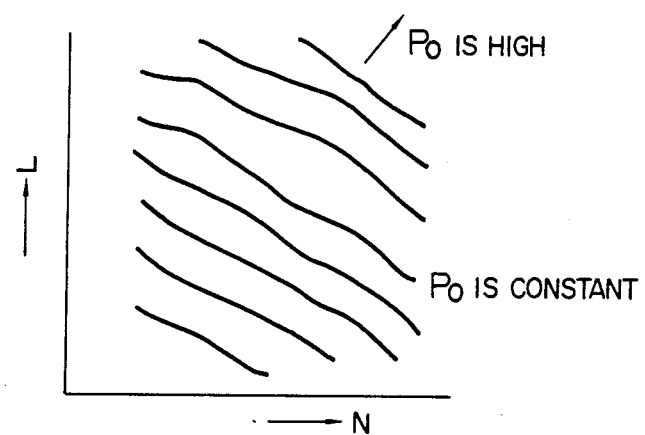
FIG. 4 is a graphical representation of the exhaust pressure with respect to the engine rpm and engine load.
Figure 3:
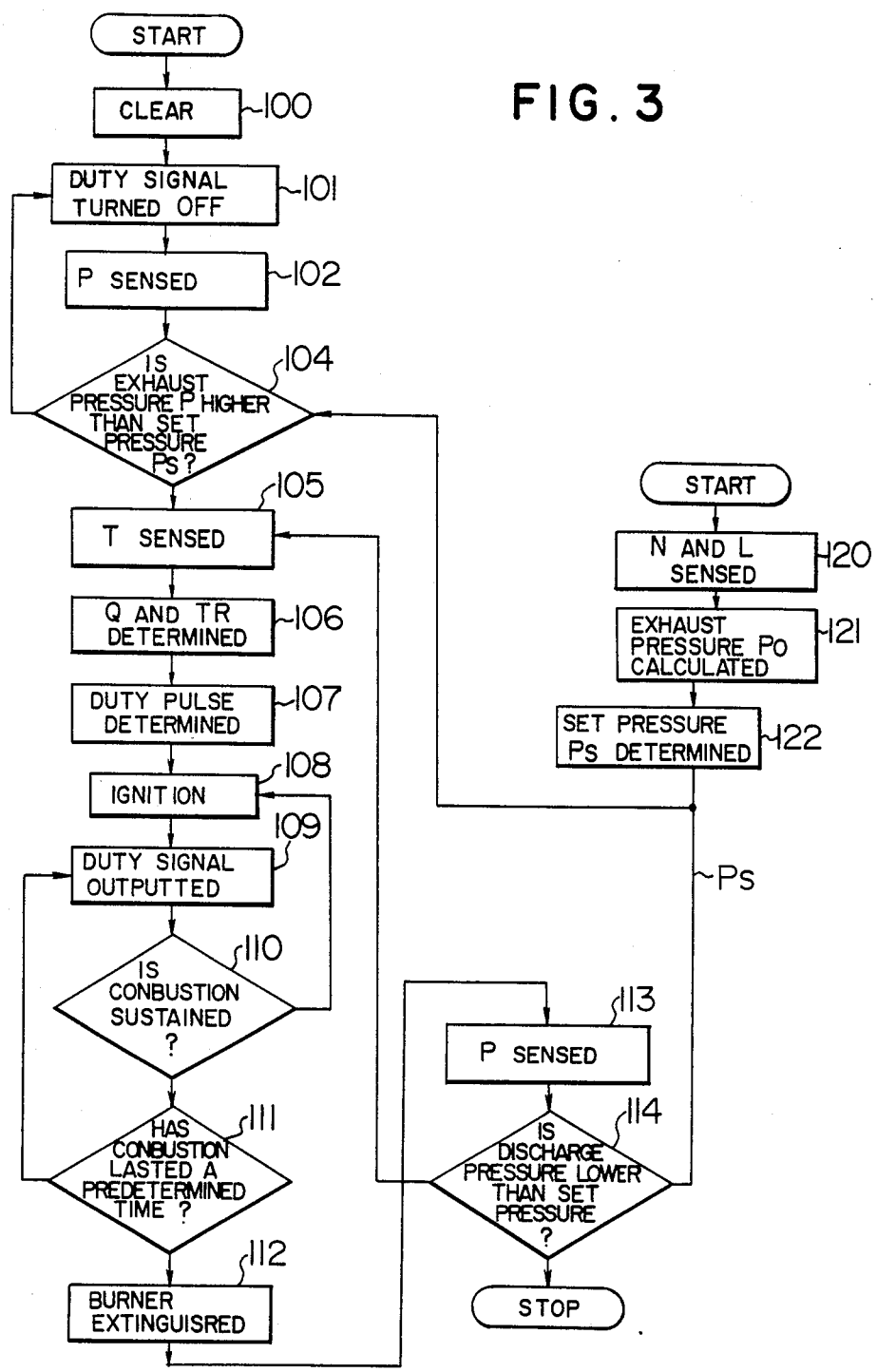
FIG. 3 is a control flow chart depicting processes of operations to be performed in effecting control by a control unit of a control system constructed in accordance with the present invention.
Figure 5:
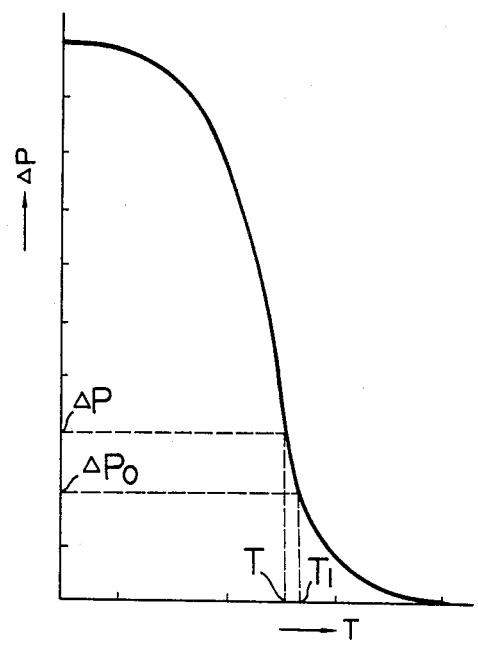
FIG. 5 is a graphical representation of the relationship between the temperature of the trap and a rise in the exhaust pressure.
Figure 6:
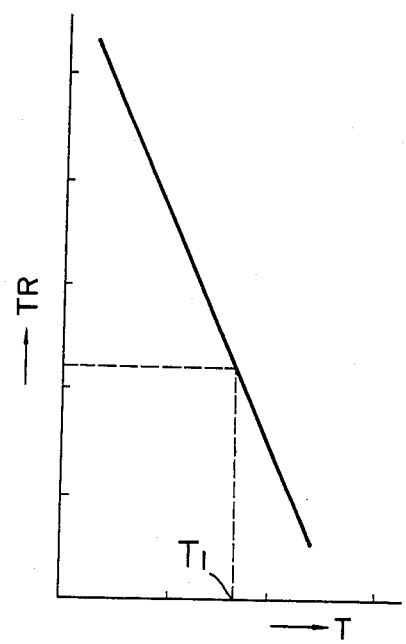
FIG. 6 is a graphical representation of the relationship between the temperature of the trap and the time required for effecting regeneration of the trap.
Figure 7:
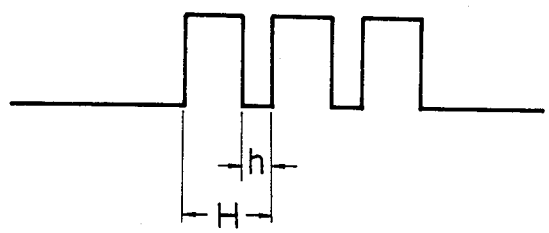
FIG. 7 shows the form of a control signal.

The fuel injection valve 18, ignition electrode 20 and fan 21 for supplying air are controlled as follows:

A control system includes a control unit 23 which, for example, may be in the form of a microcomputer, so as to enable the control to be effected readily and satisfactorily. As shown in FIG. 3, the process of operation for determining a set pressure $P_s$ in steps 120-122 and the process of operation for combustion control to be effected in accordance with the result of determination of the set pressure $P_s$ are performed in parallel to each other. However, this is not restrictive, and the two processes may be performed by using either separate hardware or a single microcomputer on a time sharing basis. As shown, the control unit 23 is actuated to sense an engine rpm N and load L in step 120 and to calculate an exhaust pressure $P_o$ (a pressure at the entrance to the trap 12) which corresponds to the sensed values of engine rpm N and load L. The exhaust pressure $P_o$ which is obtained experimentarily without the use of the trap 12 has a characteistic shown in FIG. 4. Thus, by storing this characteristic in the form of approximate equations in a read-only memory (ROM) of the control unit 23, it is possible to perform the operation of step 121. Then, in step 122, an increment $\Delta P_o$ of the exhaust pressure allowed by the trap 12 is added to the exhaust pressure $P_o$ to determine the set pressure $P_s$. Meanwhile, in the process of operation for effecting combustion control, the required sections of the microcomputer, for example, are cleared in step 100, and a signal supplied to the fuel injection valve 18 is turned off in step 101. In step 102, an actual exhaust pressure P is sensed by a pressure sensor 24, and the actual exhaust pressure P is compared with the set pressure $P_s$ in step 104. When $P<P_s$, the process is performed again by returning to step 101. However, when a condition $P>P_s$ is reached, the process shifts to combustion control operation performed in step 105 and the following because the condition indicates that an increment in pressure caused by an increase in the amount of trapped carbon particulates has exceeded the allowable value $\Delta P_o$. In step 105, a trap temperature T is sensed by a temperature sensor 25, and the amount of heat (fuel volume) supplied from the fuel injection valve 18 is determined in step 106. In determining the amount of heat, the characteristics of trap 12 as shown in FIGS. 5 and 6 are stored in the ROM of the control unit 23 and used. The characteristics shown in FIGS. 5 and 6 are such that when the trap temperature T is set at a certain value, an increment in exhaust pressure shown in FIG. 5 or a pressure loss $\Delta P$ can be obtained if the temperature T is maintained for a time of regeneration TR indicated by the ordinate in the graph shown in FIG. 6. More specifically, FIG. 5 shows that, if the temperature T is allowed to rise, the carbon particulates caught by the trap 12 are oxidized and the pressure loss $\Delta P$ decreases, and FIG. 6 shows a time which is required for performing oxidation treatment. Thus, a trap temperature $T_1$ for rendering the pressure loss $\Delta P$ equal to the allowable value $\Delta P_o$ can be obtained from the characteristic shown in FIG. 6. An amount of heat Q that should be fed to the trap 12 can be obtained by calculation performed on a difference $\Delta T$ between the trap temperatures $T_1$ and T, and, at the same time, the time of regeneration TR for feeding the amount of heat Q to the trap 12 can be determined from the characteristic shown in FIG. 6. Then, in step 107, an on-pulse duration h of a duty signal and a cycle H thereof are determined. The determination is based on the fact that by providing a fuel flow rate per unit time which is functionally determined by the on-pulse duration h of the duty signal and an amount of heat generated by such fuel, it is possible to obtain the duty h/H of the duty signal from the amount of heat Q which should be fed as determined in step 106. At the same time, an ignition signal and a fan driving signal commensurate with the duty signal are determined. Then, in steps 108 and 109, these signals are outputted to perform ignition, fuel supply and air supply. As a result, combustion is intermittently carried out in accordance with the signal shown in FIG. 7. Then, in step 100, it is checked whether or not the fuel is actually burning. The end can be attained by checking an output F of a flame sensor 26. If no combustion condition is determined, the process returns to step 108. When the combustion is confirmed, it is checked in step 111 to determine whether or not the time of regeneration TR determined beforehand has elapsed. This operation can be performed by using a timer in the control unit 23. If the time of regeneration TR has not elapsed, then the process returns to step 109 and the combustion is continued. If the time of regeneration TR has elapsed, then the exhaust pressure P prevailing at that time is sensed by the pressure sensor 24 in step 112 and compared in step 113 with the set pressure $P_s$ determined previously. That is, it is checked whether or not the exhaust pressure P has actually been reduced to a level below that of the set pressure $P_s$. If no satisfactory result is obtained, then the process of combustion control operation of step 105 and the following is repeated, until the exhaust pressure is actually reduced by the combustion. By performing combustion control in accordance with the conditions of the engine and trap 12, it is possible to attain the end of regenerating the trap 12 without fail.

From the foregoing description, it will be appreciated that according to the invention, it is possible to produce a fuel-air mixture of an atmosphere favorable for activating the catalyst provided to the trap for catching carbon particulate without being influenced by the physical and chemical changes which the exhaust gas of the engine undergoes and to heat the trap to a high temperature level with combustion gas. By virtue of these features, the exhaust emission control system for a diesel engine according to the invention is capable of positively regenerating with a high degree of efficiency the trap that has become obturated.

What is claimed is:

1. An exhaust emission control system for a diesel engine comprising:
    a trap having no directionality with respect to air permeability;
    means for introducing and directing air against said trap in a direction substantially perpendicular to a direction in which an exhaust gas flows from the engine to the trap; and
    a fuel injection nozzle opening in a path of flow of the air introduced by said introducing and directing means;
    wherein a fuel is supplied to said fuel injection nozzle to control the conditions under which said trap is subjected to an oxidation treatment so as to oxidize particulates of carbon caught by the trap to achieve regeneration of the trap.

2. An exhaust emission control system as claimed in claim 1, wherein said trap is a trap with a three-dimensional, net-like structure having a coat of catalyst applied thereto.

3. An exhaust emission control system as claimed in one of claims 1 or 2, further comprising fuel ignition means provided to said fuel injection nozzle, to enable the fuel injection nozzle to function as a burner.

4. An exhaust emission control system as claimed in claim 3, further comprising a control means for effecting control of a volume of heat generated by said burner, said control means setting an allowable exhaust pressure for determining an exhaust pressure of the engine which is allowable with respect to a rotational speed of the engine and a load applied to the engine, and controlling combustion carried out by the burner in such a manner that, when a sensed exhaust pressure of the engine exceeds the said allowable exhaust pressure, an amount of heat and a heating time necessary for performing the oxidation are determined based on an actual value of temperature of the trap that is measured and the amount of heat thus determined is supplied to the trap for a period of the heating time that has been determined.

5. An exhaust emission control system as claimed in claim 4, wherein said burner enables the combustion carried out to thereby be turned on and off by a control signal supplied from outside, and said control means is operative to effect control of the combustion carried out by the burner by using as the control signal supplied to the burner a pulse signal having an on-off ratio which is commensurate with the amount of heat necessary for achieving the oxidation.

* * * * *